T. B. DRESCHER.
MULTIFOCAL LENS AND METHOD OF MAKING THE SAME.
APPLICATION FILED FEB. 27, 1922.
1,415,535. Patented May 9, 1922.
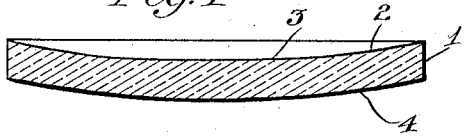
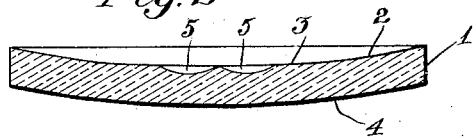
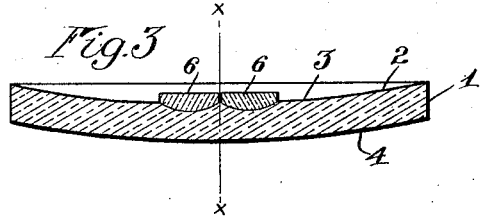
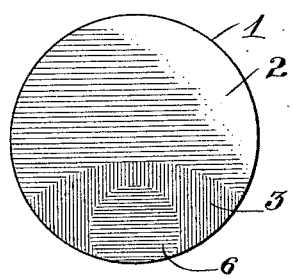 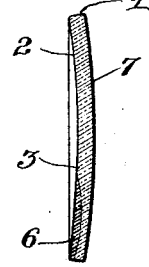
INVENTOR.
Theodore B. Drescher.
BY
his ATTORNEY.

UNITED STATES PATENT OFFICE.

THEODORE B. DRESCHER, OF ROCHESTER, NEW YORK, ASSIGNOR TO BAUSCH & LOMB OPTICAL COMPANY, OF ROCHESTER, NEW YORK, A CORPORATION OF NEW YORK.

MULTIFOCAL LENS AND METHOD OF MAKING THE SAME.

1,415,535.      Specification of Letters Patent.      Patented May 9, 1922.

Application filed February 27, 1922. Serial No. 539,429.

*To all whom it may concern:*

Be it known that I, THEODORE B. DRESCHER, of Rochester, in the county of Monroe and State of New York, have invented certain new and useful Improvements in Multifocal Lenses and Methods of Making the Same; and I do hereby declare the following to be a full, clear, and exact description of the same, reference being had to the accompanying drawings, forming a part of this specification, and to the reference numerals marked thereon.

My present invention relates to trifocal or multifocal opthalmic lenses and has for its object the provision of a lens having a plurality of different foci for near, intermediate and far vision, and is in substance composed of a single piece of glass, and also for a method of making such lenses more cheaply and with much less risk of breakage than when the attempt is made to grind all of the surfaces accurately upon a single crystal.

The improved article consists, broadly speaking, of an ophthalmic lens blank having one surface molded to form areas on two different radii, say for far and intermediate vision and within the latter area an inserted lens of glass of a different index, preferably of different refractive index, which is fused in a correspondingly shaped recess, providing, in connection with the glass with which it is combined, a third lens of greater power than the other two areas and useful for near vision.

The improved method of manufacture consist generally in molding upon one surface of a glass lens blank two areas of different curvature forming a ground and polished lens area in the one of the surfaces having the greater power, fusing therein a ground and polished lens of glass of a different index (say refractive) so that the combination of the latter lens with the lens produced by shaping the other surface of the main glass body will form a lens of higher power capable of use for near vision.

In the accompanying drawings:

Figures 1, 2 and 3 show sectional views of a blank from which a pair of lenses are to be formed showing the different stages of the operation; and Figures 4 and 5 show plan and sectional views respectively of a complete lens.

In carrying out my invention I take a blank 1 of glass and mold one of its surfaces by any of the methods or apparatus, such as are well known in the art, to form the outer area 2 on one curve and the inner or central area 3 on a different curve, the outer surface 4 of the blank being for the present not completed or finished, the blank as thus formed being shown in section in Figure 1. I then grind and polish, in the usual or any preferred manner, in the area or surface 3, a plurality of recesses 5 of a predetermined curvature, these being located at the sides of the center of the blank or holder and preferably two being formed if a single blank, is to be divided into two parts to form a pair of lenses—this step in the operation being shown in Figure 2 of the drawing. Small lens blanks 6, 6 of glass of a different index than that of the main blank (preferably a higher refractive index) having been prepared with their convex surfaces ground and polished to approximately the curve of the recesses 5, said blanks are dropped in the said recesses and the parts fused by subjecting the blanks and lenses to a sufficiently high temperature to soften the surfaces in contact to cause the parts to closely adhere without materially affecting the surfaces 2 and 3, such fusing operation being well known in the art. The operation just referred to is shown in Figure 3 of the drawings. After this operation the upper surfaces of the inserted blanks 6 and the areas 3 are ground and polished so as to be substantially flush, then the surface 2 is ground and polished so as to meet the surface area 3 by processes well known in the art. The blank 1 is then cut in two parts on the dotted line $x$—$x$ to form two half blanks from each of which a single trifocal lens may be made.

We now have a pair of blanks each having on one side two finished surfaces 2 and 3 of known curvature, and an embedded smaller circular lens of glass of a different index of refraction, and also of known curvature, and to finish the lenses it is only necessary to grind and polish the outer surface 4 of these blanks on such curves as will coordinate with the finished surfaces on the other side to produce the different powers desired for the different zones. Thus, as is usual in lenses, the central circular portion in the finished lenses shown in Figures 4 and 5, by reason of the curve of the inserted lens, the index of the glass and the curve of the outer surface will be the stronger and adapted for near vision or reading; the curve of the area indicated by 3 and that of the outer surface adapted for intermediate vision, and the curve of the surface 2 and that of the outer surface for far vision.

It will be understood that instead of making a pair of lens blanks from a single integral crystal of glass, which is afterwards divided centrally as shown and described herein, two or more separate pieces of glass could be secured adjacent to each other on a holder or block so that the various grinding and polishing operations could be performed on all of them, to produce the surfaces 2 and 3, this operation being well known in the art and described in numerous patents.

Trifocal lenses having the highest power in the form of a small circular portion composed of two kinds of glass and located within an arcuate area constituting the intermediate power, have the advantage that not only is the latter broader at the sides giving the user an increased lateral vision through this portion, but they are more easily made by the method described as the number of proper finished lines of division between different areas is reduced by one. The finishing operation given the inner surface of the reading area, which is only required to be substantially flush with that of the intermediate area, is much more easily accomplished than that required to properly flush two dissimilar surfaces that are to be merged as, for instance, those between the areas 2 and 3, so that the cost of production of an efficient trifocal lens blank is materially reduced.

It will be understood that, as usual, the lens blanks with the surfaces 2 and 3 and the embedded lens 6 are sold to opticians, and with this known data they are enabled to adjust the curve of the outer surface 4 so as to produce the necessary powers for the different parts of the lens.

I claim as my invention:

1. A multifocal lens comprising a single glass crystal having on one surface two adjacent areas having different surface curves and a smaller lens formed of glass of a different index from that of the other crystal embedded in the smaller of said areas, the opposite surface of said lens being finished on a curve coordinating with those of the opposite surface and with the embedded lens to produce a lens having three different powers.

2. A multifocal lens comprising a single glass crystal having on one surface two adjacent areas having different surface curves, the line of demarkation between the two being arcuate and higher at the center and a smaller circular lens formed of glass of a different index from that of the other crystal, embedded and fused in the smaller of said areas, the other surface of said lens being finished on a curve coordinating with those of the opposite surface and with the embedded lens to produce a lens having three different powers.

3. A blank for forming multifocal lenses comprising a single glass crystal having on one surface adjacent areas having different extent and formed on different surface curves, and a smaller circular lens of glass of a different refractive index embedded and fused in the smaller area.

THEODORE B. DRESCHER.